(12) United States Patent
Murakami et al.

(10) Patent No.: US 6,370,563 B2
(45) Date of Patent: *Apr. 9, 2002

(54) CHAT SYSTEM TERMINAL DEVICE THEREFOR DISPLAY METHOD OF CHAT SYSTEM AND RECORDING MEDIUM

(75) Inventors: Masahiko Murakami; Masahiro Matsuda, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/805,779

(22) Filed: Feb. 25, 1997

(30) Foreign Application Priority Data

Sep. 30, 1996 (JP) .............................. 8-259798

(51) Int. Cl.[7] .............................................. G06F 15/16
(52) U.S. Cl. ..................................................... 709/205
(58) Field of Search ...................... 395/200.33, 200.39, 395/200.35, 200.48; 348/13, 15; 345/370, 331, 332, 329, 756, 780, 758; 707/10; 709/203, 204, 205, 218

(56) References Cited

U.S. PATENT DOCUMENTS

| | | | | |
|---|---|---|---|---|
| 5,694,549 A | * | 12/1997 | Carlin et al. ............. | 395/200.2 |
| 5,737,011 A | * | 4/1998 | Lukacs ...................... | 348/15 |
| 5,764,916 A | * | 6/1998 | Busey et al. ........... | 395/200.57 |
| 5,793,365 A | * | 8/1998 | Tang et al. ................. | 345/329 |
| 5,905,476 A | * | 5/1999 | McLaughlin et al. .......... | 345/1 |

FOREIGN PATENT DOCUMENTS

| | | |
|---|---|---|
| JP | 4-309155 | 10/1992 |
| JP | 5-53950 | 3/1993 |
| JP | 5-324521 | 12/1993 |
| JP | 7-212392 | 8/1995 |
| JP | 7-325776 | 12/1995 |

* cited by examiner

*Primary Examiner*—Glenton B. Burgess
*Assistant Examiner*—Tod Kupstas
(74) *Attorney, Agent, or Firm*—Staas & Halsey

(57) ABSTRACT

A chat system in which conversations by characters in plural channels are displayed, and of these conversations, a conversation in a main channel and conversations in other channels are displayed in individual regions 23, 24 on a display screen, and an inputted statement is displayed in an intermediate region 22 of the individual regions 23, 24. The chat system hence realizes a display method having a notice function for use while working in an office, and information extracting function enabled by electronic expression of conversations, along with a recording medium used for execution thereof.

7 Claims, 18 Drawing Sheets

FIG. 3

COCOA - %DIST

FILE(F) EDIT(E) SETUP(P) CHANNEL(C) COMMAND(O) URL(U) HELP(H)

%DIST  [URL] ☐ PAUSE

```
15:58 *** fukuZzz is known as fukuyama
16:13 <morimori> Where were you going?
16:14 <morimori> What do you want me for?>sakamocch
16:23 <sakamocch> Do you continue language study or not?/
Mr. Morinaga.
16:23 <morimori> Please, finish it.
16:24 <sakamocch> OK.
16:27 <morimori> Thank you.
```

```
17:37 <%INFO MUL> I bought a new soft.
17:37 <%INFO pine> I want to try it. >mul
17:38 <%INFO MUL> Wait for a while.
17:39 <%INFO pine> Start up mul5200.
```

Boyoyon
iwao
kakuta
kanai
kanai-2
makoto
morimori
MUL
MUL4
MUL5
oku
pine
yamatsumo8

COCOA                                    NUM

FIG. 5

```
FILE(F) EDIT(E) SETUP(P) CHANNEL(C) COMMAND(O) URL(U) HELP(H)
```

%DIST  [URL] ☐ PAUSE

15:58 *** fukuZzz is known as fukuyama
16:13 <morimori> Where were you going?
16:14 <morimori> What do you want me for?>sakamocch
16:23 <sakamocch> Do you continue language study or not?/
Mr. Morinaga.
16:23 <morimori> Please, finish it.
16:24 <sakamocch> OK.
16:27 <morimori> Thank you.

17:39 <%INFO pine>Start up mul5200.
17:38 <%INFO MUL> Wait for a while.
17:37 <%INFO pine>I want to try it.>mul
17:37 <%INFO MUL> I bought a new soft.

COCOA

Boyoyon
iwao
kakuta
kanai
kanai-2
makoto
morimori
MUL
MUL4
MUL5
oku
pine
yamatsumo8

NUM

CHAT SYSTEM TERMINAL DEVICE THEREFOR DISPLAY METHOD OF CHAT SYSTEM AND RECORDING MEDIUM

BACKGROUND OF THE INVENTION

The present invention relates to a chat system for exchanging information between terminal devices of a computer system a terminal device of the chat system, display method of the chat system, and a recording medium used for execution thereof.

A conversational chat system for exchanging information between terminal devices is known. FIG. 1 is a block diagram showing a structural example of such chat system. In the chat system, a chat server 2 which is a host computer, and plural terminal devices 3 to 6 are connected through a network 1 of public circuits, and the chat server 2, when receiving messages from the terminal devices 3 to 6, transmits them immediately to other terminal devices 3 to 6, so that conversations by characters among operators who operate the individual terminal devices are realized.

In the chat system, the statement and the corresponding speaker's name are displayed in the terminal devices 3 to 6. Therefore, when plural statements are uttered simultaneously, the speakers are not confused, and the content of the statement is securely transmitted to other operators, so that opinions may be exchanged smoothly. Besides, the statements displayed in the terminal devices 3 to 6 can be directly saved as text data, and proceedings may be easily configured from the text data.

On the other hand, as seen in the recent boom of intranet, the electronic revolution of office is progressing rapidly, but little has been discussed so far about electronic handling of office conversations playing vital roles in collaborative works (exchange of information, greeting, etc.).

The conventional chat system (for example, the real-time meeting of IRC or Nifty) is based on exclusive engagement in the meeting, but for use in such office conversations, the system must be designed to be used while doing work. Yet, the conventional chat system does not make the best of electronic conversations.

SUMMARY OF THE INVENTION

The invention is devised in the light of the above situation, and it is an object thereof to present a display method of a chat system having a notice function for use while working in an office and an information extracting function enabled by electronic processing of conversations, and a recording medium for use in execution thereof.

A terminal device of a chat system according to a first aspect of the invention comprises means for displaying conversations by characters in plural channels, and displaying, out of the conversations, the conversation in the main channel and conversations in other channels in individual regions of one display screen, and means for displaying an inputted statement in an intermediate region of the individual regions.

In the terminal device of above chat system, the conversation in the main channel and conversations in other channels are displayed in individual regions of one display screen, and the statement inputted from a local keyboard is displayed in an intermediate region of the individual regions of the main channel and other channels, so that the conversations in other channels can be viewed while chatting by paying attention to the conversation content of the presently speaking channel (main channel).

A chat system according to a second aspect of the invention comprises the terminal device of the chat system in the first aspect of the invention.

In this chat system, the terminal device displays the conversation in the main channel and conversations in other channels in individual regions of one display screen, and the statement inputted from a local keyboard is displayed in an intermediate region of the individual regions of the main channel and other channels, so that the conversations in other channels can be viewed while chatting by paying attention to the conversation content of the presently speaking channel (main channel).

A display method of a chat system according to a third aspect of the invention is characterized by displaying conversations by characters in plural channels, and displaying, out of the conversations, the conversation in the main channel and conversations in other channels in individual regions of one display screen, and displaying an inputted statement in an intermediate region of the individual regions.

In a display method of a chat system according to a fourth aspect of the invention, the conversation in the main channel and the conversations in other channels are displayed in a time series so that the latest statement may be displayed at the position closest to the intermediate region of the individual regions.

In a display method of a chat system according to a fifth aspect of the invention, other channel is replaced into a main channel when the statement of the corresponding channel in the region of the other channel is specified.

In a display method of a chat system according to a sixth aspect of the invention, URL (uniform resource locator) displayed in conversation is stored together with the statements for a specific number of lines before and after the URL, a list of URLs is displayed according to an instruction, and the selected URL is listed and displayed together with the statement.

In a display method of a chat system according to a seventh aspect of the invention, the stored URLs and the statements for a specific number of lines before and after the URLs are registered in a database, and are listed and displayed according to an instruction.

In a display method of a chat system according to an eighth aspect of the invention, a keyword is set, and when the keyword is displayed in display of a conversation, the keyword is displayed in bold type or a specified sound is generated, and when the keyword is received while conversation is not displayed, the screen is returned to the conversation display, and the keyword is emphasized.

In a display method of a chat system according to a ninth aspect of the invention, the keywords are stored together with the statements for a specific number of lines before and after the keywords, and the keywords and the statements are listed and displayed according to an instruction.

In a display method of a chat system according to a tenth aspect of the invention, the keywords and the statements are listed and displayed at the end of conversation.

In a display method of a chat system according to an eleventh aspect of the invention, after storing the keyword, when the keyword is inputted, it is listed and displayed together with the statements.

In a display method of a chat system according to a twelfth aspect of the invention, at the end of the conversation, the keywords are registered together with the statements in a list application program provided outside, and are saved after end of the conversation.

In a display method of a chat system according to a thirteenth aspect of the invention, participants in the conversation are listed and displayed, and the telephone is connected to the selected participants.

A recording medium according to a fourteenth aspect of the invention records a computer program of a display method of a chat system comprising a step of sending and receiving conversations in plural channels, a step of displaying, out of the conversations in plural channels, the conversation in the main channel and conversations in other channels in individual regions of one display screen, and a step of displaying an inputted statement in an intermediate region of the individual regions.

In the display method of the chat system according to the third aspect of the invention and the computer system controlled by the program recorded in the recording medium according to the fourteenth aspect, the conversation in the main channel and conversations in other channels are displayed in individual regions of one display screen, and the statement inputted from a local keyboard is displayed in an intermediate region of the individual regions of the main channel and other channels, so that the conversations in other channels can be viewed while chatting by paying attention to the conversation content of the presently speaking channel (main channel).

In a recording medium according to a fifteenth aspect of the invention, the step of displaying the conversation in the main channel and the conversations in other channels in individual regions of one display screen, displays in a time series the latest statement at the position closest to the intermediate region of the individual regions.

In the display method of the chat system according to the fourth aspect of the invention and the computer system controlled by the program recorded in the recording medium according to the fifteenth aspect of the invention, the conversation in the main channel (the presently chatting channel) and conversations in other channels are displayed in a time series so that the latest statement may be displayed at the position closest to the intermediate region of the individual regions of the main channel and other channels. Therefore, the conversation contents in the main channel and other channels can be reviewed from the latest one while chatting into the main channel.

A recording medium according to a sixteenth aspect of the invention comprises a step of replacing other channel with the main channel when the statement in the region of other channel is specified.

In the display method of the chat system according to the fifth aspect of the invention and the computer system controlled by the program recorded in the recording medium according to the sixteenth aspect of the invention, when the statement in the region of other channel is specified, this channel becomes the main channel. As a result, the operator can immediately participate in the conversation of interesting topic or curious subject.

A recording medium according to a seventeenth aspect of the invention records a computer program of a display method of a chat system comprising a step of sending and receiving conversations in plural channels, a step of displaying the conversations, a step of storing the URL displayed in the conversations together with the statements for a specific number of lines before and after the URL, a step of displaying a list of URLs according to an instruction, and a step of displaying a list of the selected URL together with the statement.

In the display method of the chat system according to the sixth aspect of the invention and the computer system controlled by the program recorded in the recording medium according to the seventeenth aspect of the invention, the URL displayed in conversation is stored together with the statements for a specific number of lines before and after it. According to an instruction from the operator, a list of URL is displayed, and the selected URL is listed and displayed together with the statements for a specific number of lines before and after it.

When a URL appears in conversation, it is often preceded or accompanied by an explanation (for example, this URL is interesting in this point, someone needed the information about something, etc.). Therefore, by extracting the context simultaneously with the character string of URL, important information can be picked up from the conversation. Furthermore, by registering it in the database, a useful information database accessible any time can be configured from ordinary conversations.

A recording medium according to an eighteenth aspect of the invention comprises a step of registering the stored URL and the statements for a specific number of lines before and after the URL in a database, and a step of displaying a list of registered URL and the statements for a specific number of lines before and after the URL according to an instruction.

In the display method of the chat system according to the seventh aspect of the invention and the computer system controlled by the program recorded in the recording medium according to the eighteenth aspect of the invention, the URL displayed in conversation is stored together with the statements for a specific number of lines before and after it, and the stored URL and the statements for a specific number of lines before and after it are registered in the database. According to an instruction from the operator, a list of URL is displayed together with the statements for a specific number of lines before and after it.

When a URL appears in conversation, it is often preceded or accompanied by an explanation (for example, this URL is interesting in this point, someone needed the information about something, etc.). Therefore, by registering in the database, a useful information database accessible any time can be configured from ordinary conversations.

A recording medium according to a nineteenth aspect of the invention records a computer program of a display method of a chat system comprising a step of sending and receiving conversations in plural channels, a step of displaying the conversations, a step of setting a keyword, a step of displaying the keyword in bold type or generating a specified sound when the keyword is displayed during display of the conversation, and a step of returning to the display of conversation when the keyword is received while conversation is not displayed.

In the display method of the chat system according to the eighth aspect of the invention and the computer system controlled by the program recorded in the recording medium according to the nineteenth aspect of the invention, by setting a keyword, when the keyword is displayed during display of conversation, the keyword is displayed in bold type or specified sound is generated to emphasize the keyword. When the keyword is received while conversation is not displayed, the display of conversation is returned to emphasize the keyword.

Accordingly, the operator, by setting, for example, the own name as the keyword, can reply immediately when his (her) name is called if not exclusively engaged in the conversation, and therefore can do other work at ease. At the same time, the calling side also feels at ease that the partner will respond when his (her) name is called, so that the participants can speak at ease if not exclusively engaged in the conversation.

A recording medium according to a twentieth aspect of the invention includes a step of storing the keyword together with the statements for a specific number of lines before and after the keyword.

In the display method of the chat system according to the ninth aspect of the invention and the computer system controlled by the program recorded in the recording medium according to the twentieth aspect of the invention, by setting a keyword, when the keyword is displayed during display of conversation, the keyword is stored together with the statements for a specific number of lines before after it. According to an instruction from the operator, the keyword is listed and displayed together with the statements for a specific number of lines before and after it.

Accordingly, the operator, by setting, for example, the own name as the keyword, can reply immediately and confirm the context, too, when his (her) name is called if not exclusively engaged in the conversation, and therefore can do other work at ease. At the same time, the calling side also feels at ease that the partner will respond if the name is called, so that the participants can speak at ease if not exclusively engaged in the conversation.

A recording medium according to a twenty-first aspect of the invention includes a step of listing and displaying the keyword together with the statement at the end of the conversation.

In the display method of the chat system according to the tenth aspect of the invention and the computer system controlled by the program recorded in the recording medium according to the twenty-first aspect of the invention, by setting a keyword, when the keyword is displayed during display of conversation, the keyword is stored together with the statements for a specific number of lines before after it. At the end of the conversation, the keyword is listed and displayed together with the statements for a specific number of lines before after it.

Accordingly, the operator, by setting, for example, the own name as the keyword, can review for which reasons he is called during the day and check for works left undone.

A recording medium according to a twenty-second aspect of the invention includes a step of listing and displaying the keyword together with the statement, when the keyword is inputted, after a step of storing the keyword together with the statement for a specific number of lines before and after the keyword.

In the display method of the chat system according to the eleventh aspect of the invention and the computer system controlled by the program recorded in the recording medium according to the twenty-second aspect of the invention, by setting a keyword, when the keyword is displayed during display of conversation, the keyword is stored together with the statements for a specific number of lines before after it. By input from a local keyboard, when the operator speaks, the keyword is listed and displayed together with the statements for a specific number of lines before after it.

Accordingly, the operator, by setting, for example, the own name as the keyword, can return to the terminal device when his (her) name is called while staying away from the terminal device, and immediately confirm the calling of the name and its context.

A recording medium according to a twenty-third aspect of the invention includes a step of registering the keyword together with the statement in a list application program provided outside at the end of conversation.

In the display method of the chat system according to the twelfth aspect of the invention and the computer system controlled by the program recorded in the recording medium according to the twenty-third aspect of the invention, by setting a keyword, when the keyword is displayed during display of conversation, the keyword is stored together with the statements for a specific number of lines before after it. At the end of conversation, the keyword is registered together with the statements for a specific number of lines before and after it in a list application program provided outside, and is saved after conversation.

Accordingly, the operator, by setting, for example, the own name as the keyword, can review for which reasons he has been called, save the record, and check for works left undone.

A recording medium according to a twenty-fourth aspect of the invention records a computer program of a display method of a chat system including a step of sending and receiving conversations in plural channels, a step of displaying the conversations, a step of listing and displaying participants in the conversations, and a step of connecting the selected participants by telephone.

In the display method of the chat system according to the thirteenth aspect of the invention and the computer system controlled by the program recorded in the recording medium according to the twenty-fourth aspect of the invention, by listing and displaying the participants in the conversations and connecting the participants selected by the operator by telephone, the operator can connect by telephone by easy operation when wishing to speak directly person to person during conversation.

The above and further objects and features of the invention will more fully be apparent from the following detailed description with the accompanying drawings.

BRIEF DESCRIPTION OF THE SEVERAL VIEWS OF THE DRAWINGS

FIG. 3 is an explanatory diagram showing a display screen according to the display method of chat system in third and fifth aspects of the invention;

FIG. 5 is an explanatory diagram showing a display screen according to the display method of chat system in a fourth aspect of the invention;

DESCRIPTION OF THE PREFERRED EMBODIMENTS

Figure 1:
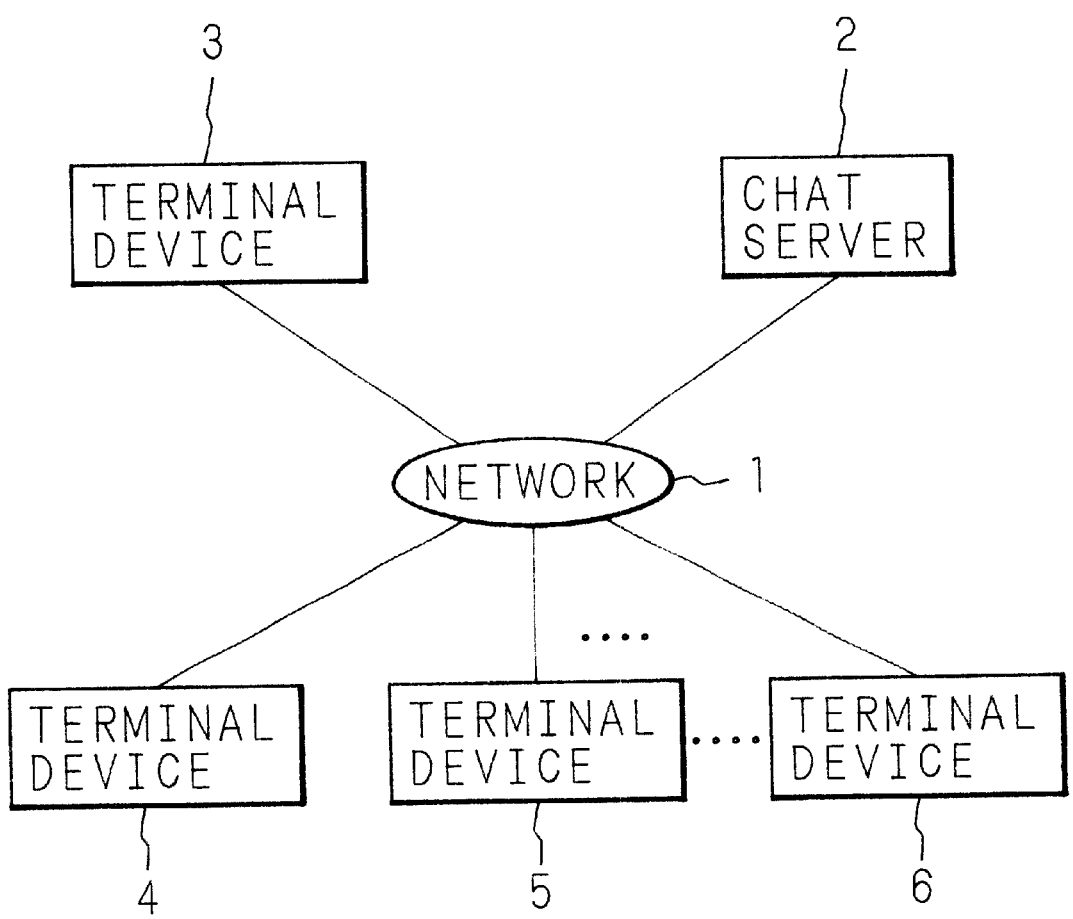
FIG. 1 is a block diagram showing a structural example of an embodiment of a chat system of the invention.

Referring now to the drawings, some of the preferred embodiments of the invention are described in detail below.

FIG. 1 is a block diagram showing a structural example of a chat system according to the invention. This chat system is intended to realize conversation by characters between operators who operate the individual terminal devices, by connecting a chat server 2 which is a host computer, and plural terminal devices (for example, personal computers) 3 to 6 according to the invention through a network 1 of public circuits, and sending the message received in the chat server 1 from the terminal devices 3 to 6 immediately to other terminal devices.

In the chat system, the statement and the corresponding speaker's name are displayed in the terminal devices 3 to 6, and therefore, when plural statements are uttered simultaneously, the speakers are not confused.

Figure 2:
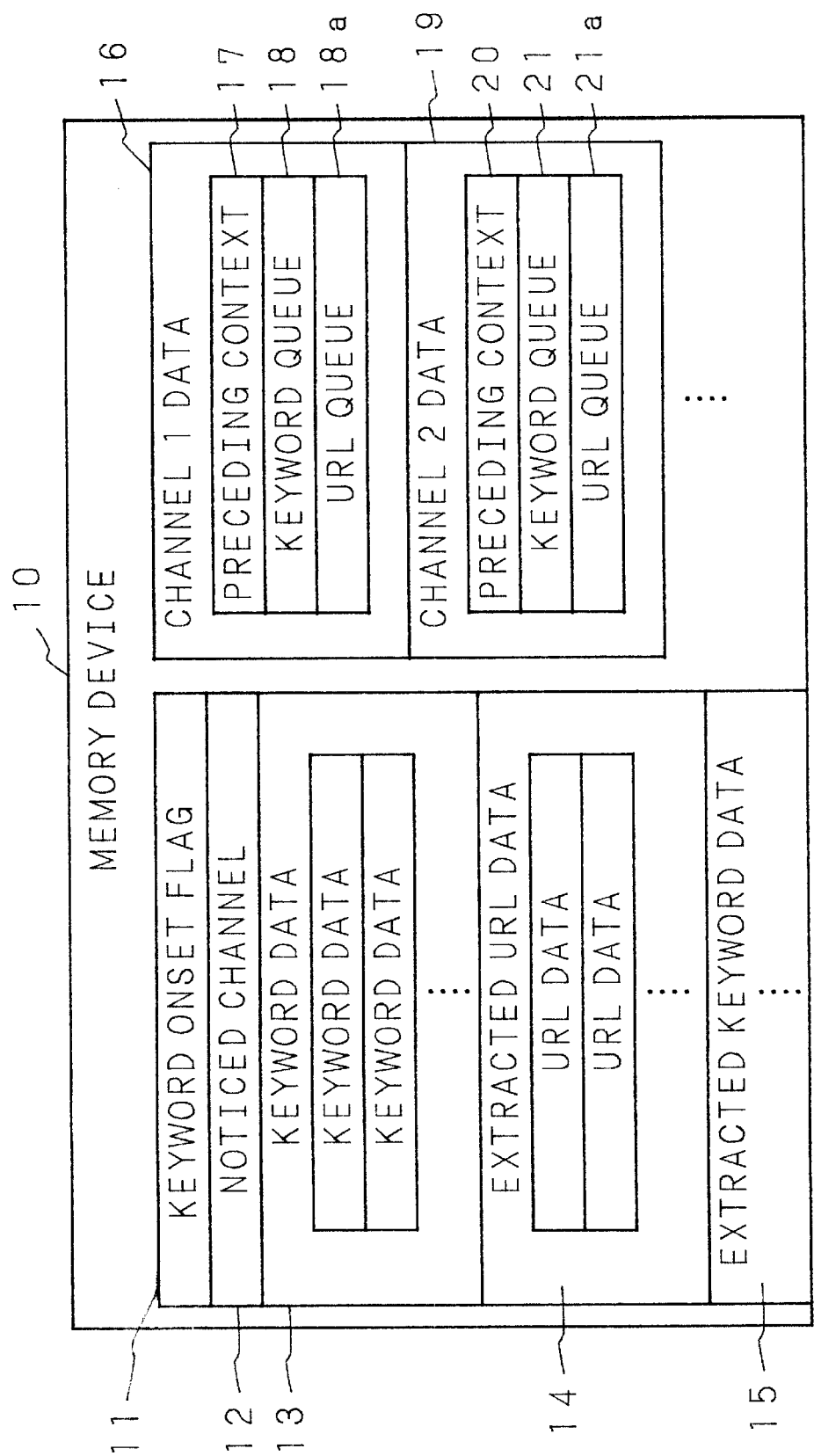
FIG. 2 is a block diagram showing a construction of a memory device of a terminal device for executing a display method of a chat system of the invention.

FIG. 2 is a block diagram showing a construction of a memory device 10 of a terminal device for executing the display method of the chat system according to the present invention. This memory device 10 includes a region 12 for storing the channel being noticed at the present (main channel), a keyword onset flag 11 used from the onset of a keyword and inputted from a local keyboard until display of the keyword together with the preceding and succeeding context (tenth aspect), a region 13 for storing keyword data composed of a set keyword character string and action when the keyword is received and displayed (seventh aspect), and a region 15 for storing the extracted keyword character string and statement for a specific number of lines before and after it (eighth to eleventh aspects).

The memory device 10 further includes a region 14 for storing the extracted URL (Uniform Resource Locator) character string and statement for a specific number of lines before and after it (sixth aspect), and regions 16, 19, etc., which are for storing data in each one of plural channels.

The regions 16, 19 for storing data in every channel are respectively regions of channels 1 and 2, each composed of preceding context storing regions 17, 20 (sixth, eighth to eleventh aspects) for storing the preceding context (latest statement) for a specific number of lines, keyword queues (first-in, first-out or FIFO lists) 18, 21 (eighth to eleventh aspects) for registering the succeeding context for a specific number of lines of keyword, and URL queues 18a, 21a (sixth aspect) for registering the succeeding context for a specific number of lines of URL, and the memory device 10, similarly hereinafter, includes a required number of regions.

FIG. 3 is an explanatory diagram for showing the display screen of the terminal device of the chat system in the first aspect, and the display screen in the display method of chat system according to the third and fifth aspects. This display screen has a region 23 for displaying the conversation in the channel (main channel) being noticed at the present in the upper portion, a region 24 for displaying conversations in other channels in the lower portion, and a region 22 for displaying the statement inputted from a local keyboard in the middle enclosed by the regions 23, 24, and further includes a region 25 for listing and displaying the names of participants in the conversations in the channel being noticed at the present and other channels at the right end portion.

In the region 23 for displaying the conversation in the channel being noticed at the present, each statement is composed of the speech time (e.g. 16:23), speaker's name (handle name) (that is, nickname, e.g. morimori), and content of speech (e.g. please finish it), and it is displayed in the sequence of utterance.

In the region 24 for displaying the conversations in other channels, when there are plural other channels, regardless of the speaking channels, statements are displayed in the sequence of speech. Each statement is composed of the speech time, speaking channel name (e.g. %INFO), speaker's name (nickname, e.g. MUL), and content of speech (e.g. wait for a while), and it is displayed in the sequence of utterance.

Figure 4:
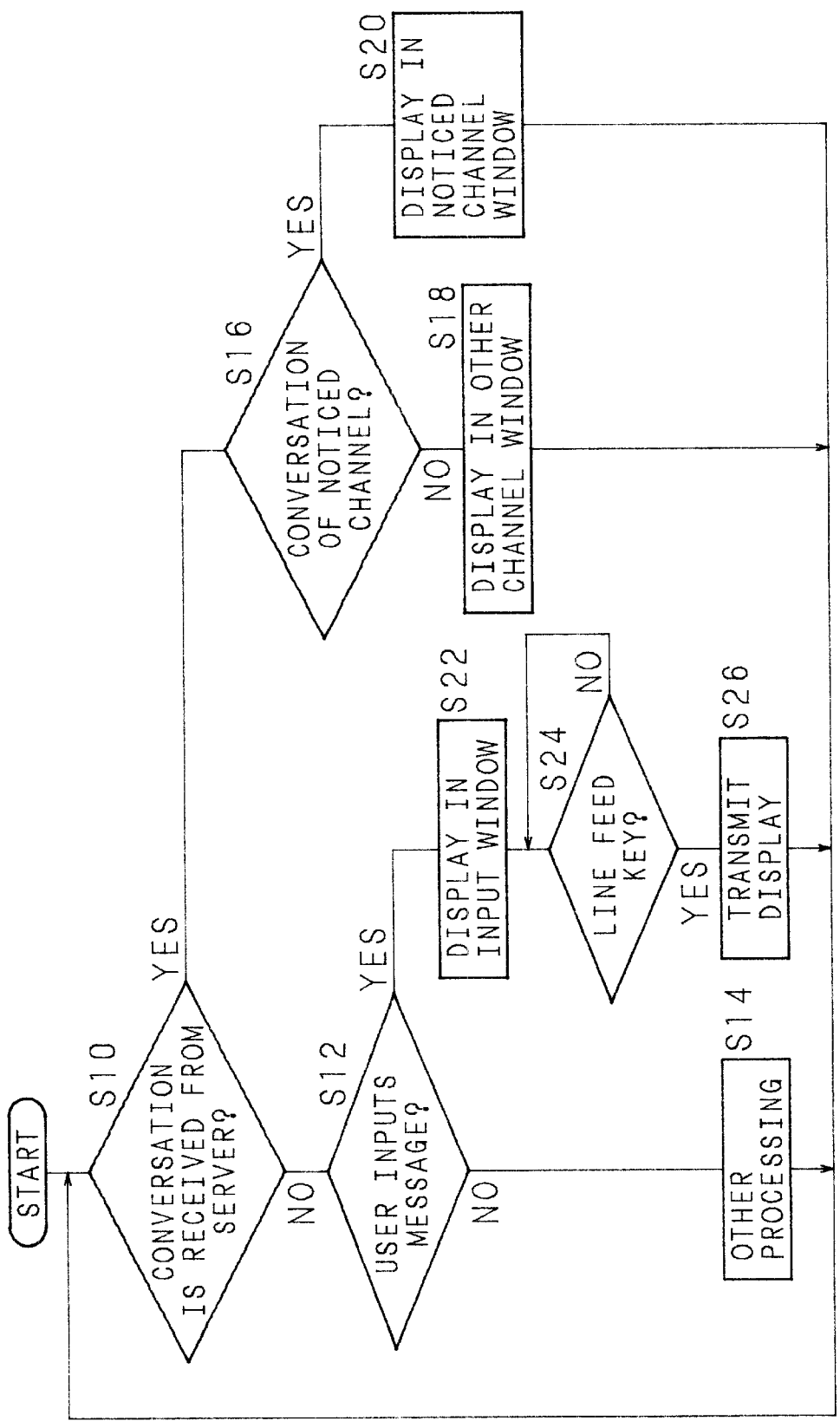
FIG. 4 is a flowchart showing operation of the terminal device for executing the display method of chat system in third and fifth aspects of the invention.

FIG. 4 is a flowchart showing operation of the terminal device of the chat system in the first aspect and the terminal device for executing the display method of the chat system in the third and fifth aspect. When a conversation (statement) is received from the chat server (Step S10, YES), the terminal device displays (Step S20) the conversation in the window (region) 23 of the channel being noticed when the conversation corresponds to speech in that channel (Step S16, YES), and returns. When the conversation is not speech in the channel being noticed (Step S16, NO), the terminal device displays (Step S18) the conversation in the window (region) 24 for other channels, and returns.

The statement transmitted from the chat server consists of the speaker's name (nickname), speaking channel name, and content of when, for example the statement includes, "mul privmsg #cocoa good afternoon", it is composed of "mul: speaker's name", "privmsg: command showing conversation", and "#cocoa: destination name".

When conversation (statement) from the chat server is not received (Step S10, NO), and the user (operator) inputs a message (statement) from a local keyboard (Step S12, YES), the terminal device displays the message in the input window (region of displaying inputted statement) 22 (Step S12), and when the line feed key is operated (Step S24, YES), it transmits the message, displays (Step S26) the conversation in the window 23 in the channel being noticed, and returns.

When the user does not input a message from the local keyboard (Step S12, NO), the terminal device programs other processes (Step S14) and returns.

The terminal device, when the conversation (statement) displayed in the window 24 of other channel is double-clicked by a pointing device such as mouse (not shown), displays the conversation in the channel in the window 24 of the channel being noticed, regarding the channel to which the conversation belongs as the channel being noticed. The conversation of the channel hitherto displayed in the window 23 is displayed in the window 24 in a time series (if there are other channels, including the conversations therein) (fifth aspect).

In this case, the conversation displayed in the window 24 of other channel is displayed in a format of the channel name, speaker's name, and content of speech, for example, "<% INFO: MUL> wait for a while", that is, "<channel name: speaker's nickname> content of speech", and the terminal device acquires the content of the line from the window 24 when the user clicks this conversation. The terminal devices recognizes the portion between "<" and ":" as the channel name, and changes the channel being noticed to this channel.

Alternatively, the operation may be as follows.

The terminal device has a correspondence table of each line of window 24 of other channel and speaking channels provided in the memory device. This correspondence table is updated as follows.

1. The correspondence table is cleared when starting up.
2. The message is displayed in the unit of one line in the window 24 of other channel.
3. When displaying the message in the window 24 of other channel, the channel name is added to the end of the correspondence table.
4. As a result of 1, 2, 3, the channel name corresponding to the message in each line is stored in the correspondence table.

When the user double-clicks the window 24 of other channel, the terminal device acquires the double-clicked line (line number) from the window 24. Searching the correspondence table by using the line number, the channel name corresponding to the line number is acquired. The acquired channel number is the channel being noticed.

FIG. 5 is an explanatory diagram showing the display screen of the display method of chat system according to a fourth aspect. In this display screen, the conversation displayed in the region 24 displaying conversation in the other channels, is displayed downward in the sequence of utterance, and the latest statement is displayed in the position closest to the region 22 for displaying the inputted speech. The other display method and operation of the terminal device are same as in the embodiment of the display method of the chat system according to the third and fifth embodiments, and its explanation is omitted.

Figure 6:
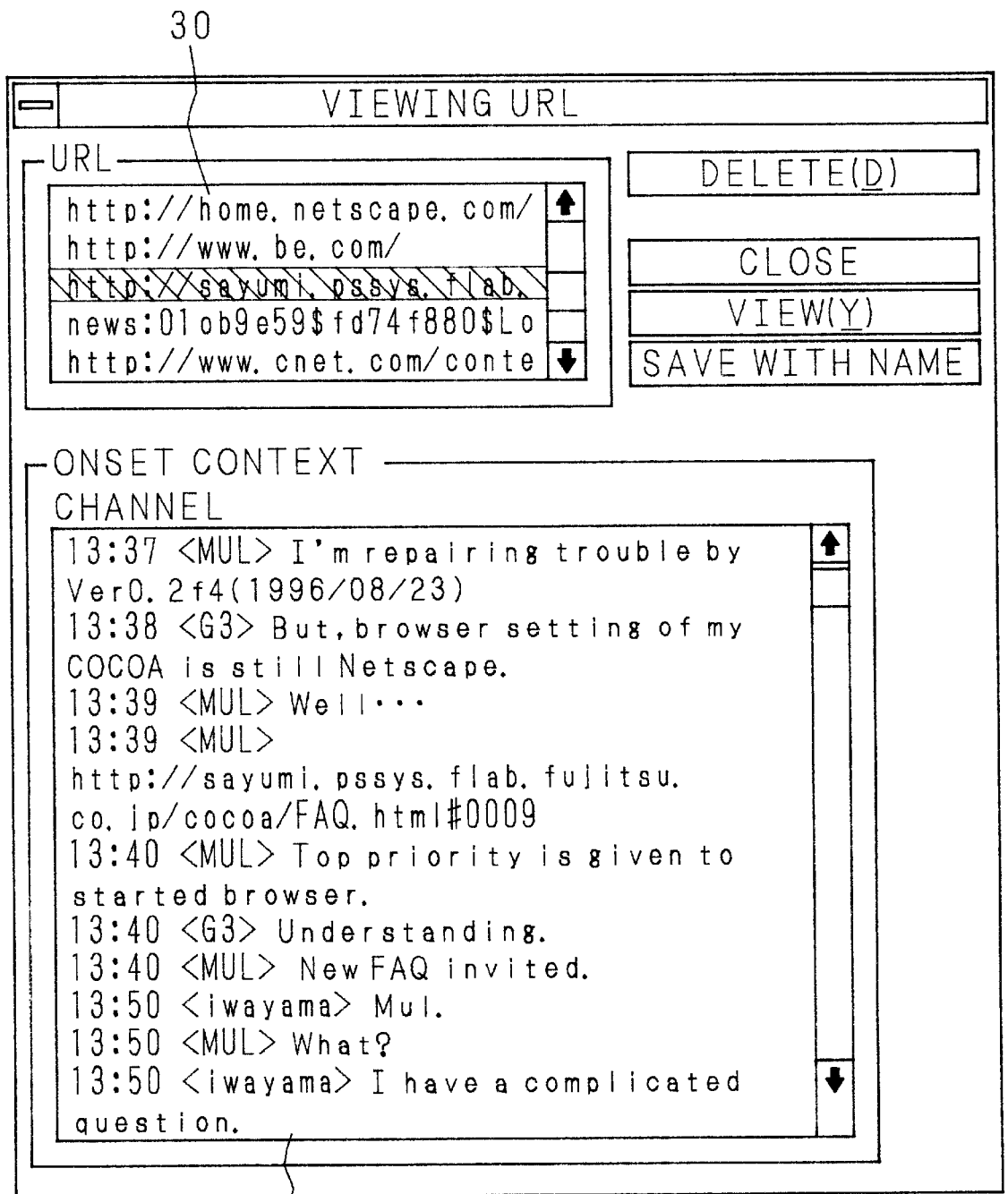
FIG. 6 is an explanatory diagram showing a screen for displaying a list of URL and a list of conversations for a specific number of lines before and after a selected URL according to the display method of chat system in a sixth aspect of the invention.

FIG. 6 is an explanatory diagram showing a screen for displaying a list of URL and a list of conversation (statement) for a specific number of lines before and after a selected URL. In this screen, a URL list 30 extracted from the screen in FIG. 3 is disposed in the upper portion, and a conversation (statement) list 31 for a specific number of lines before and after the URL selected in the URL list 30 is disposed in the lower portion. This screen is displayed as the URL (U) is selected from the menu in the screen shown in FIG. 3.

Figure 7:
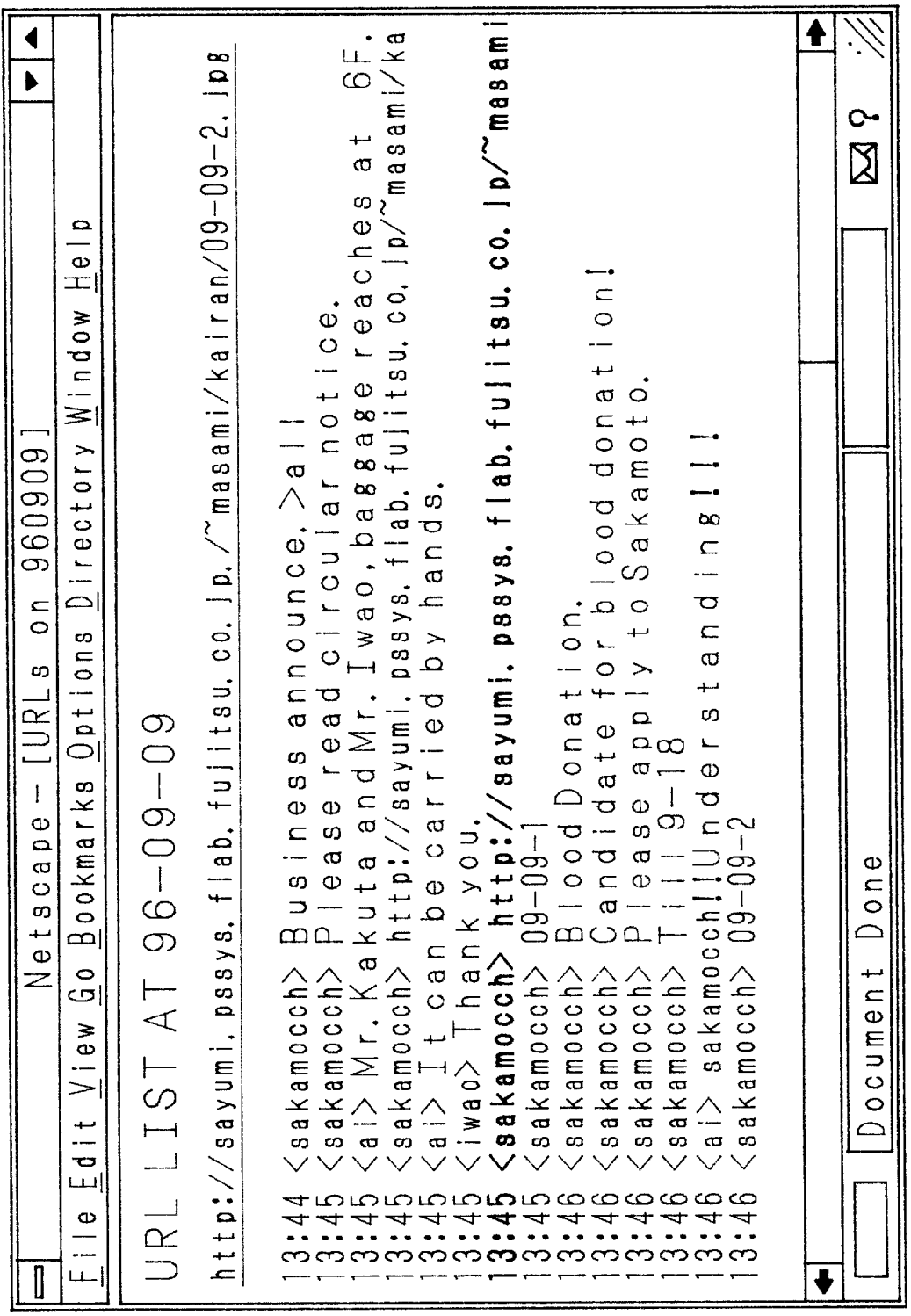
FIG. 7 is an explanatory diagram showing a display screen according to the display method of chat system in a seventh aspect of the invention.

FIG. 7 is an explanatory diagram showing the display screen for displaying the URL registered in the database and a list of conversation (statement) for a specific number of lines before and after it, according to the display method of chat system of a seventh aspect. In this screen, the display is made in the daily unit.

Figure 8:
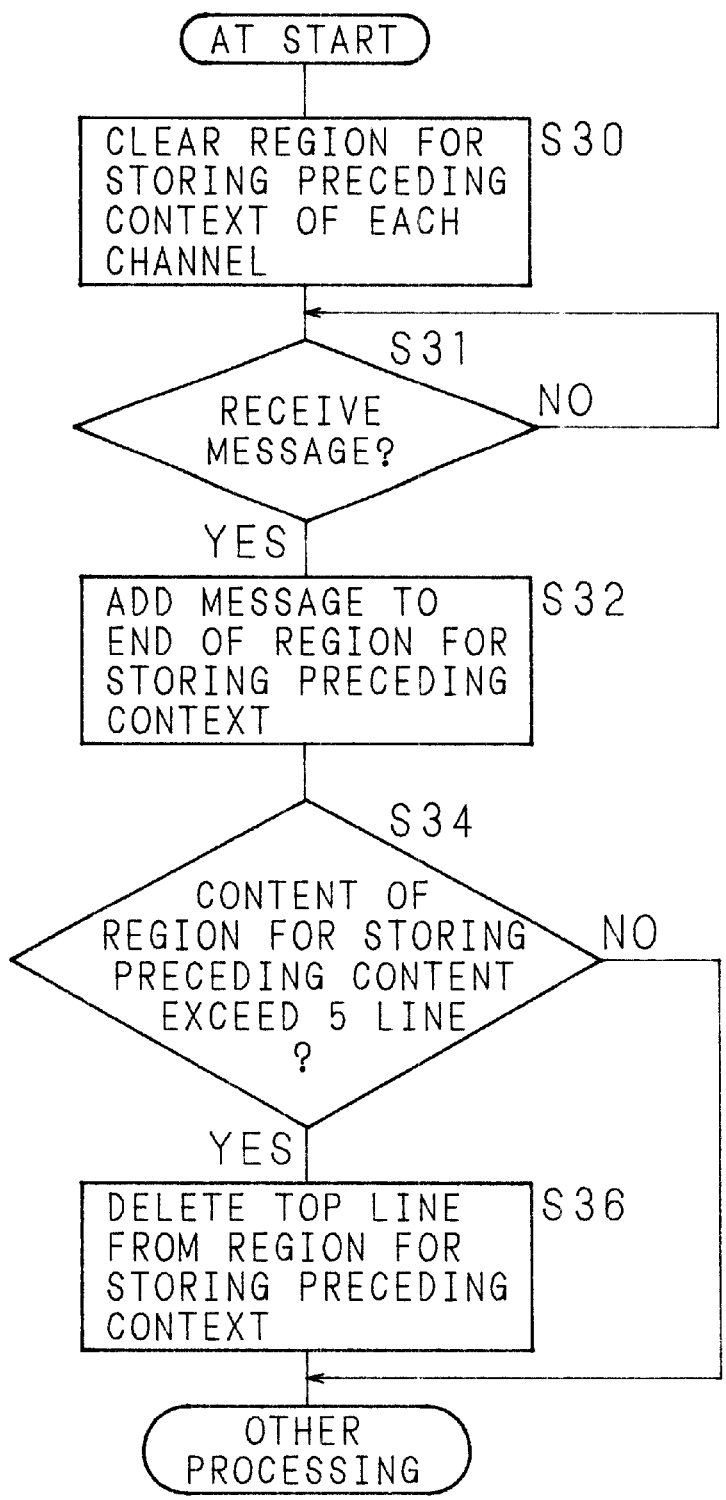
FIG. 8 is a flowchart showing operation of the terminal device for executing the display method of chat system in sixth and seventh aspects of the invention.
Figure 9:
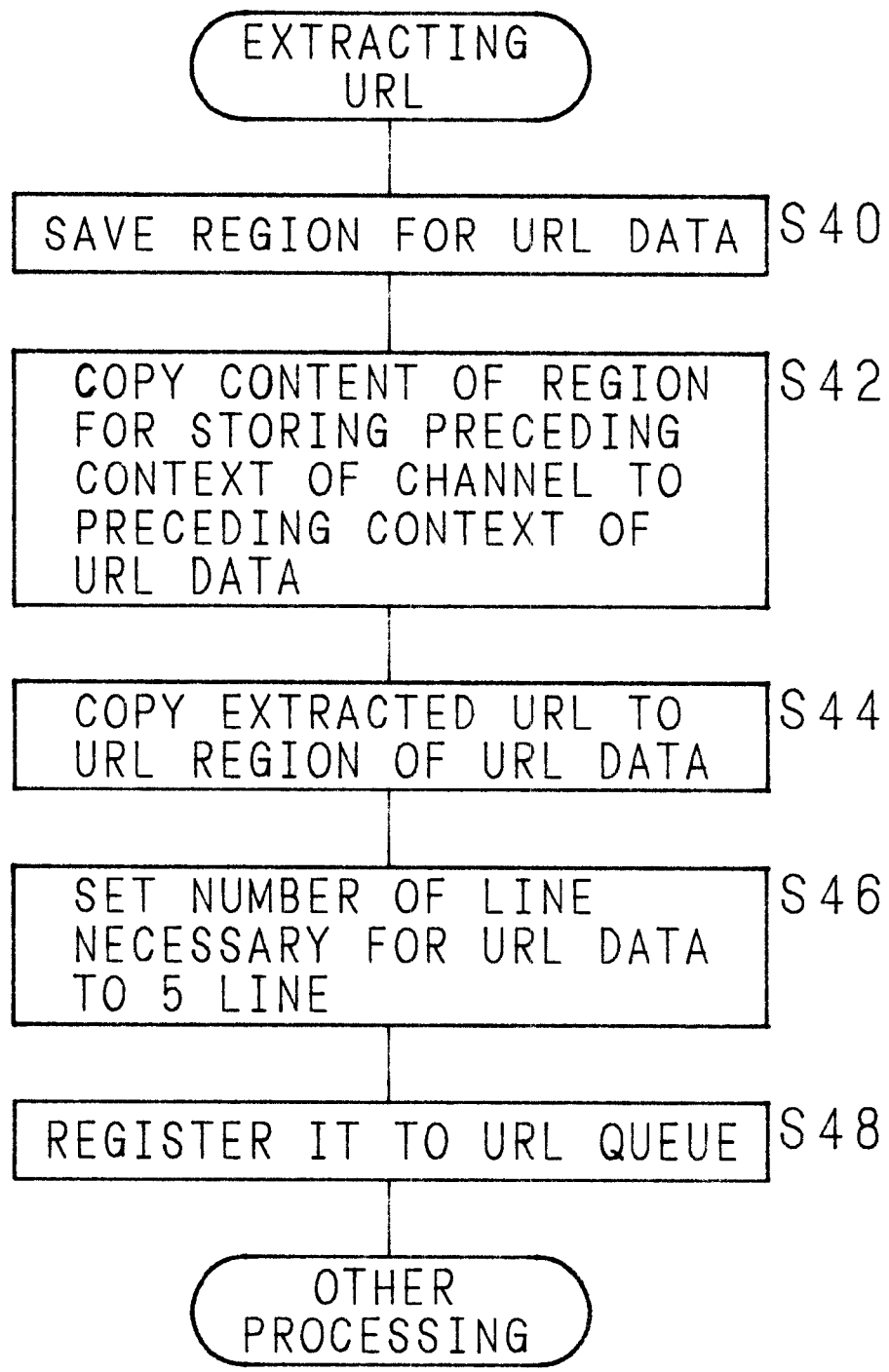
FIG. 9 is a flowchart showing operation of the terminal device for executing the display method of chat system in sixth and seventh aspects of the invention.
Figure 10:
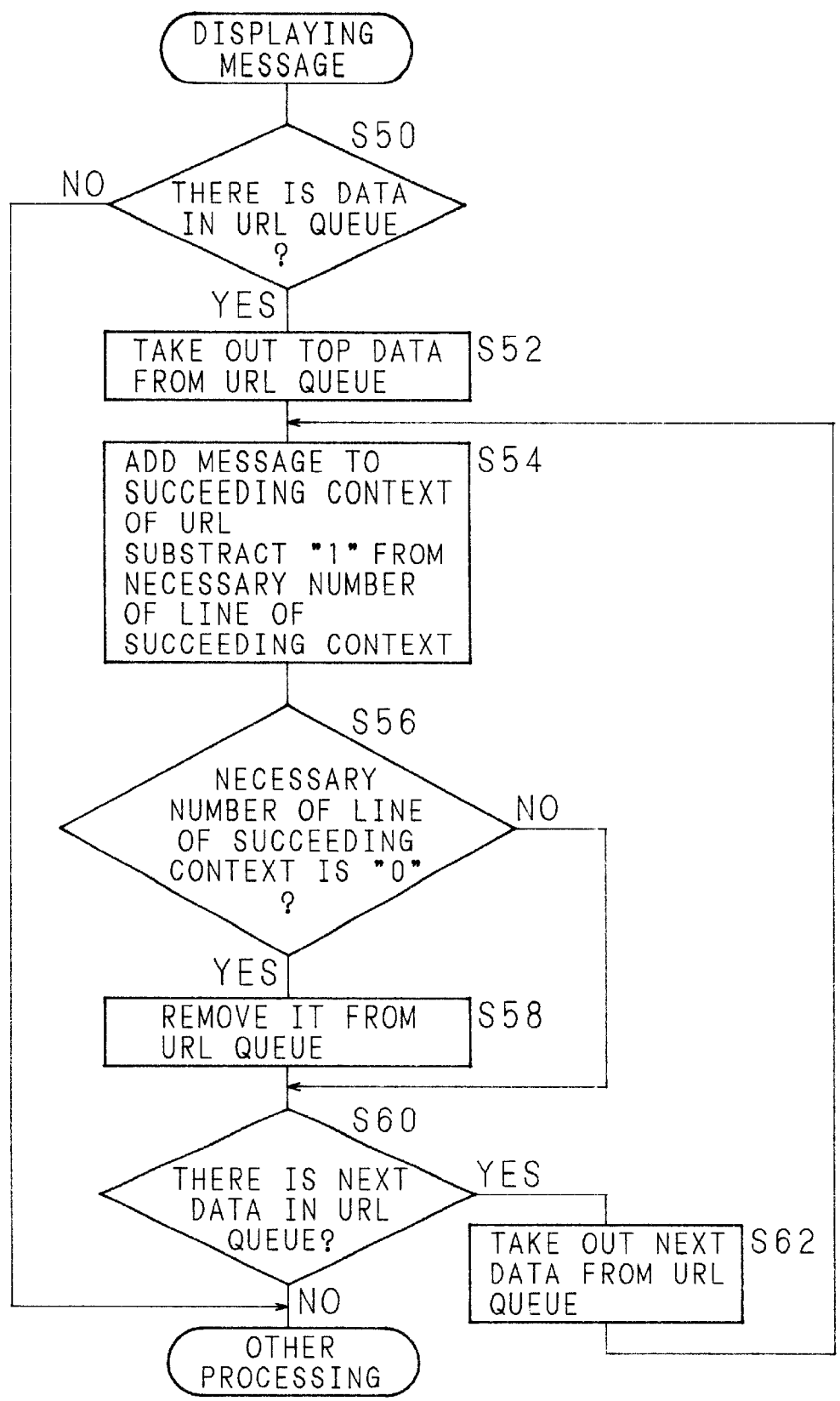
FIG. 10 is a flowchart showing operation of the terminal device for executing the display method of chat system in sixth and seventh aspects of the invention.

FIG. 8 to FIG. 10 are flowcharts showing the operation of the terminal device for executing the display method of the chat system of the sixth and seventh aspects. The terminal device clears (Step S30) the preceding context storage regions 17, 20 (FIG. 2) of each channel when starting up.

The terminal device, every time receiving the message (conversation) (Step S31), adds (Step S32) the message to the end of the preceding context storage region of the channel. When the message stored in the preceding context storage region exceeds, for example, five lines (Step S34, YES), the first one line of the preceding context storage region is deleted (Step S36), so that the stored message may not exceed five lines.

As illustrated in FIG. 9, when extracting the URL displayed on the screen the terminal device, saves (Step S40) the region of the displayed URL portion in the region 14 (FIG. 2) of the extracted URL data. Next, the content of the preceding context storage region of the channel in which the URL is displayed is copied (Step S42) in the region saved at step S40 as the preceding context of URL. The extracted URL is copied (Step S44) in the region saved at Step S40.

Next, the number of lines of the succeeding context required for the URL data is set, for example, at five lines (Step S46), and registered in URL queues 18a, 21a of the channel (Step S48).

As illustrated in FIG. 10, every time the message (conversation) is displayed on the screen, the terminal device checks (Step S50) whether there is data in the URL queue of the channel of the message or not, and if there is data (Step S50, YES), the top data is taken out (Step S52).

The message is added in the region saved at Step S40 as the succeeding context of the URL data, and "1" is subtracted (Step S54) from the data taken out at Step S52.

Consequently, when the data after subtracting "1" at Step S54 is "0" (Step S56, YES), it is removed from the URL queue (Step S58), and the URL queue is checked for presence or absence of next data (Step S60). When the data after subtracting "1" at Step S54 is not "0" (Step S56, NO), the URL queue is immediately checked for presence or absence of next data (Step S60).

When there is next data in the URL queue (Step S60, YES), the data is taken out (Step S62), and the next message is added in the region saved at Step S40 as the succeeding data of URL data, and "1" is subtracted from the data taken out at Step S62 (Step S54). Similarly, thereafter, the data is added until the succeeding context reaches five lines.

In this way, since the URL queues is a first-in first-out list, when the URL is displayed in the screen within an interval of five lines, the succeeding context for five lines can be kept for each URL.

Figure 11:
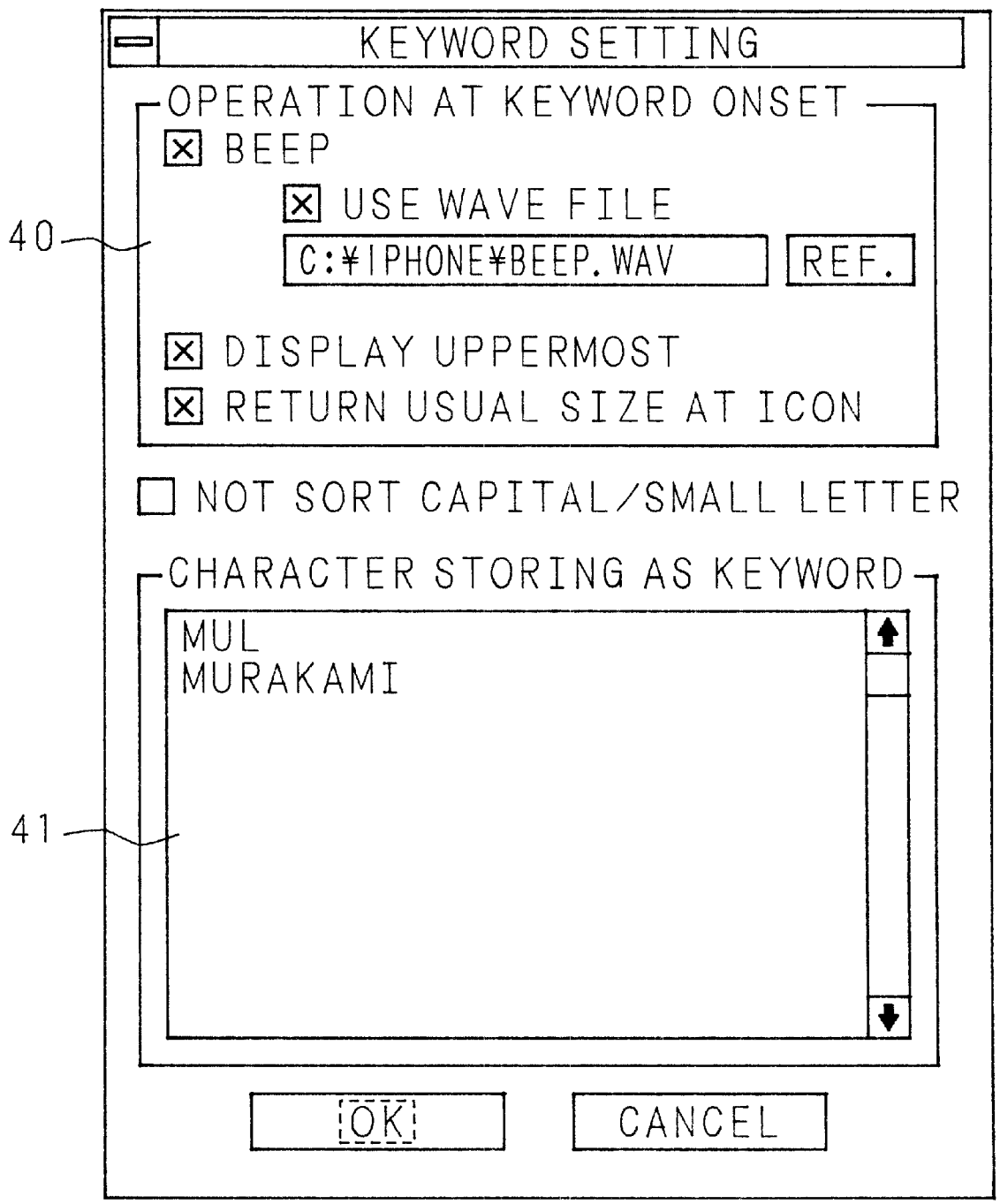
FIG. 11 is an explanatory diagram showing screen for keyword setting according to the display method of chat system in eighth to twelfth aspects of the invention.

FIG. 11 is an explanatory diagram showing the screen for setting a keyword according to the display method of the chat system of eighth to twelfth aspects. In this screen, a keyword (or keywords) is set in a lower region 41, and when the set keyword is displayed in the conversation display screen shown in FIG. 3 or sent from the chat server, the action is set in an upper region 40 (for example, beeping, shown in front screen (display in bold type), or returning to ordinary size in the case of an icon (returning to the conversation display screen shown in FIG. 3)).

The set data is stored in the keyword data storage region 13 (FIG. 2) as keyword data.

The terminal device for executing the display method of the chat system according to the eighth to twelfth aspects, when the set keyword is displayed in the conversation display screen shown in FIG. 3, beeps or displays the keyword on the front screen. When other than the conversation display screen, when the set keyword is sent from the chat server, it is returned to the conversation display screen.

When the terminal device extracts the keyword displayed on the screen, a region for the displayed keyword portion is kept in the region 15 of the extracted keyword data (FIG. 2).

The terminal device has keyword queues 18, 21 (FIG. 2) same as in the case of URL in each channel, and its operation for extracting the preceding context, keyword and succeeding context is same as the operation in the terminal device for executing the display method of the chat system in the sixth and seventh aspects, except that the URL is replaced by the keyword, and the description is omitted.

Figure 12:
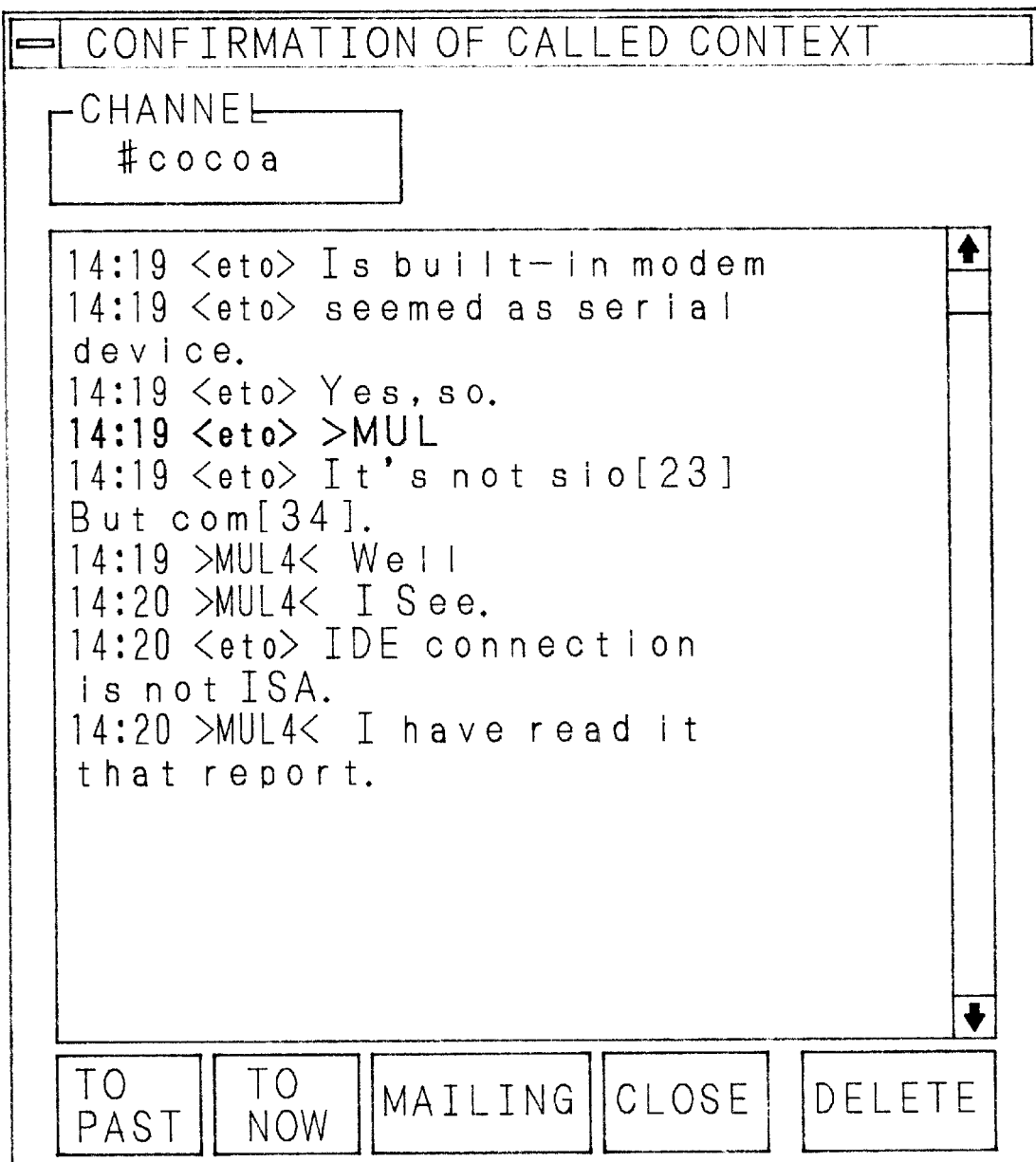
FIG. 12 is an explanatory diagram showing screen for displaying extracted preceding context, keyword and succeeding context according to the display method of chat system in ninth and eleventh aspects of the invention.

FIG. 12 is an explanatory diagram showing the screen for displaying the extracted preceding context, keyword and succeeding context in the display method of the chat system according to ninth and eleventh aspects. The called context can be confirmed herein.

The screen for displaying list of the extracted preceding context, keyword and succeeding context by the 0 display method of the chat system according to the ninth, tenth and twelfth aspects is same as in FIG. 7 showing the a URL, except that the URL is replaced by the keyword.

The terminal device for executing the display method of the chat system of the tenth and twelfth aspects confirms whether there is data or not in the region 15 of extracted keyword data (FIG. 2) at the end of conversation, and when there is data, the same screen as in the case of URL in FIG. 7 is displayed.

Figure 13:
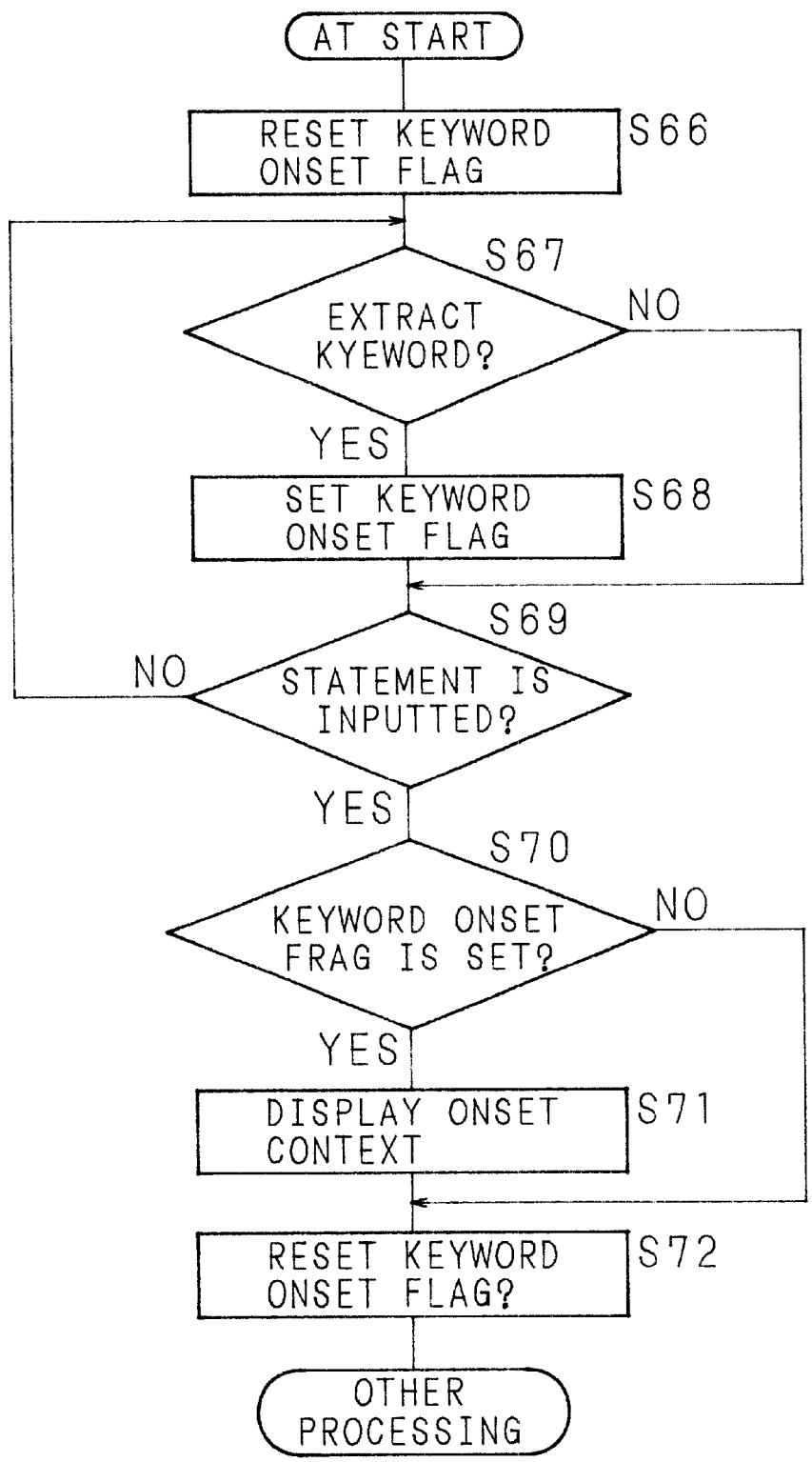
FIG. 13 is a flowchart showing operation of the terminal device for executing the display method of chat system in the eleventh aspect of the invention.

FIG. 13 is a flowchart showing the operation of the terminal device for executing the display method of the chat system according to the eleventh embodiment. When starting up, the terminal device resets a keyword onset flag 11 (FIG. 2) (Step S66).

The terminal device sets the keyword onset flag (Step S68) when the set keyword is displayed in the conversation display screen shown in FIG. 3 or the keyword is sent from the chat server and extracted (Step S67, YES).

The terminal device, when the keyword onset flag 11 is set (Step S70, YES) at inputting a message (statement) from a local keyboard by the user (Step S69, YES), displays the keyword onset context (FIG. 12) (Step S72), and resets the keyword onset flag 11 (Step S74).

Figure 14:
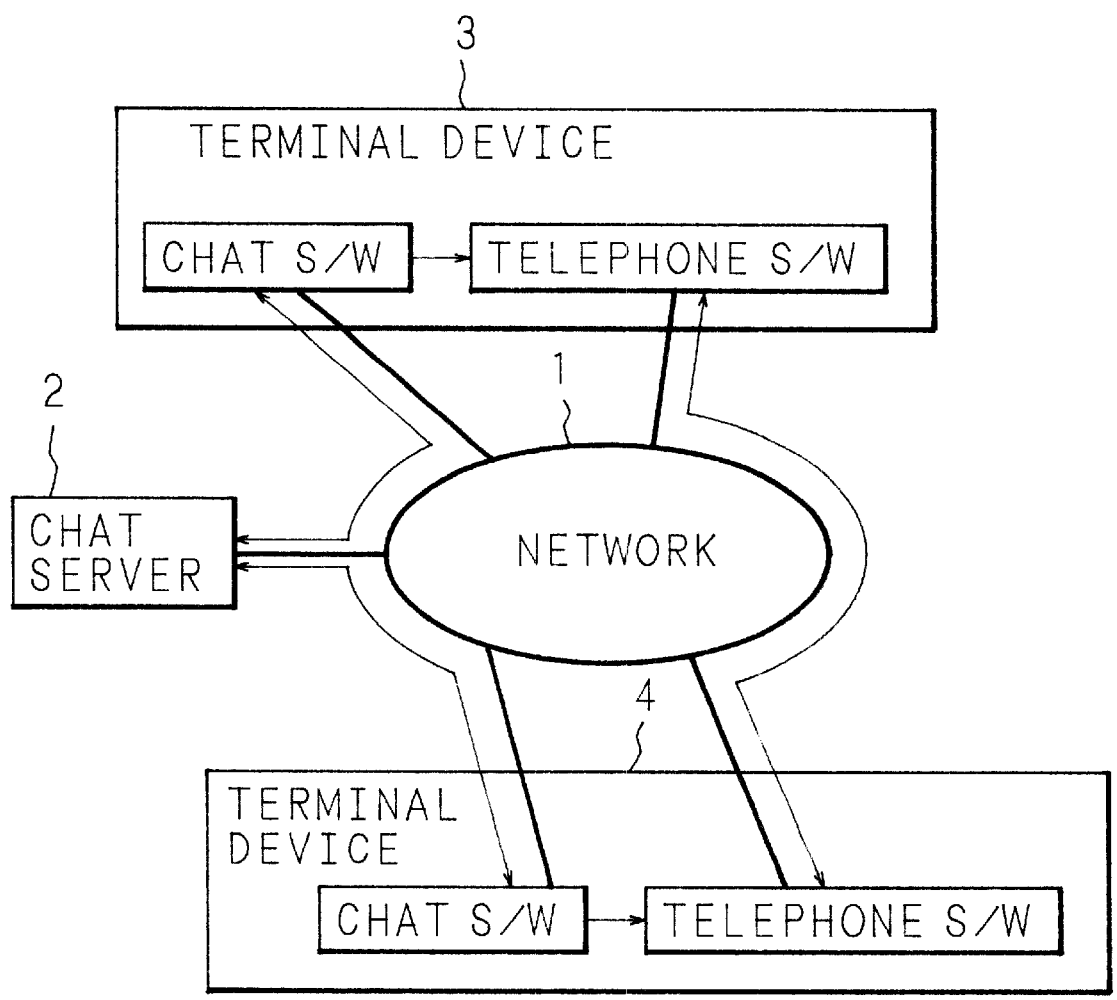
FIG. 14 is a conceptual diagram showing the concept of display method of chat system in a thirteenth aspect of the invention.

FIG. 14 is a conceptual diagram showing the concept of the display method of the chat system in a thirteenth aspect. When the user selects a partner for calling by telephone from a region 25 displaying a list of participants on the conversation display screen of the terminal device 3 shown in FIG. 3, it is connected to the partner's terminal device 4 by telephone through a network 1 of public circuits by telephone software. This telephone circuit is separate from the circuit used by the chat system. In usual telephone, it is same as mentioned above, and the method of calling includes a method of connected by an exchange through the network 1, and a method of connecting the telephone set and the terminal device.

In the storage device of the terminal device, a region for storing telephone numbers used by the user is provided.

It is also possible to call in the following method.

For example, "mul" makes a call to "pine". The terminal device prepares a calling message in a format of, for example, "^APHONE 164.70.21.211^A", and sends this message to "pine" in the same manner as in conversation.

Herein, by enclosing by "^A", it is distinguished from the conversation, and "PHONE" means a calling request, and "164.70.21.211" is the IP address of the terminal used by "pine".

By using a command of chat system, when this message is sent in a format of, for example, "privmsg pine: ^APHONE 164.70.21.211^A", it is transmitted to the "pine" side by the chat server as "mul privmsg pine ^APHONE 164.70.21.211^A".

The terminal device at the "pine" side checks if the message is enclosed by "^A" or not when processing the message, and if enclosed, the content is analyzed.

When the content is "PHONE", it means a telephone request, and the IP address "164.70.21.211" next of "PHONE" is acquired, and by using this IP address, a telephone call is made through the telephone software.

Since this IP address is an address of a terminal device of "mul", this telephone is received and connected by the telephone software of the terminal device of "mul".

Figure 15:
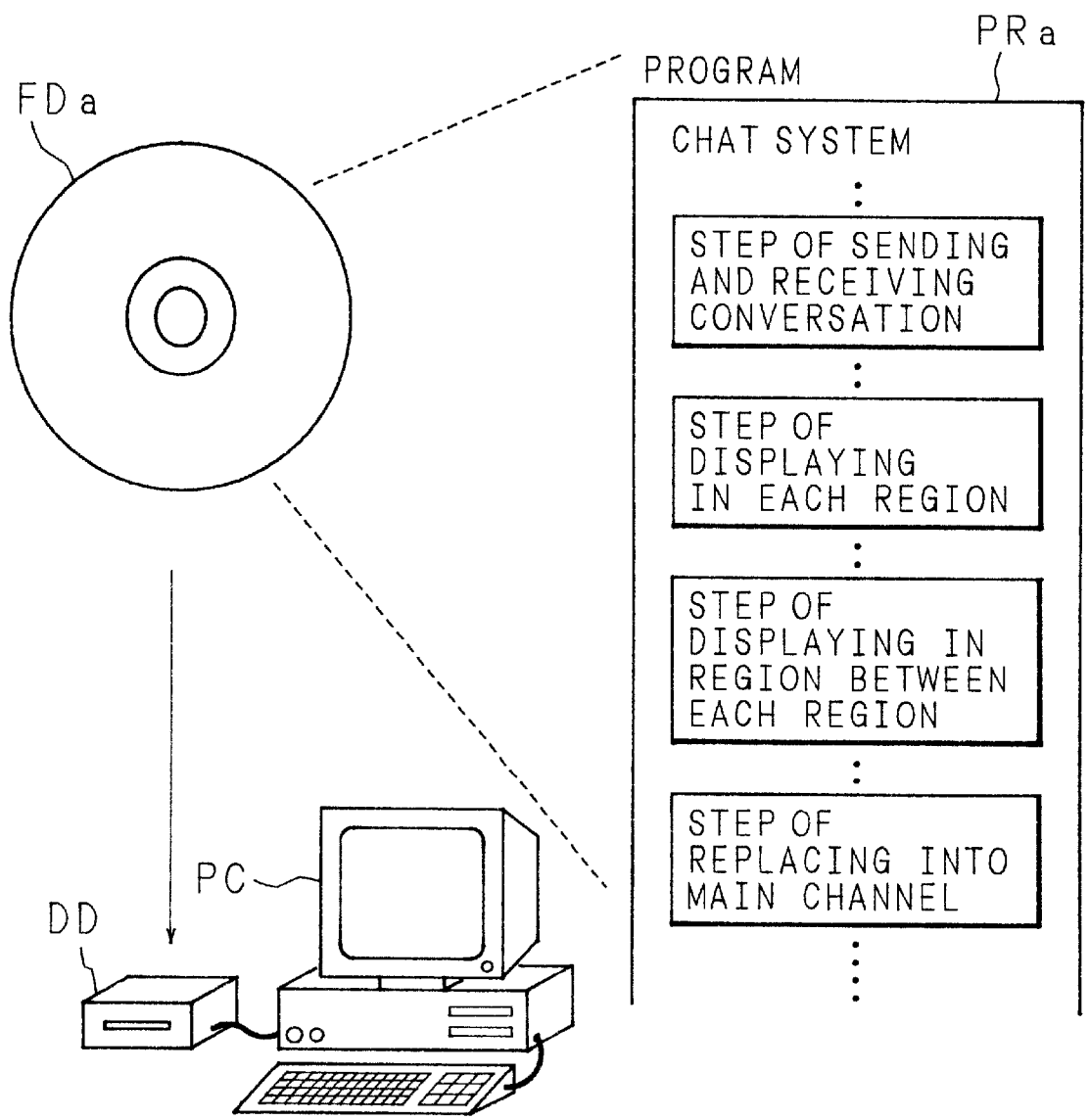
FIG. 15 is an explanatory diagram showing construction of an embodiment of a recording medium in fourteenth to sixteenth aspects of the invention.

FIG. 15 is an explanatory diagram showing a construction of an embodiment of a recording medium according to fourteenth to sixteenth aspects. This recording medium is a recording medium FDa such as flexible disk, CD-ROM disk or magneto-optical disk, recording a computer program PRa comprising a step of sending and receiving conversations in plural channels, a step of displaying the conversation in the channel being noticed (main channel) out of these conversations and conversations in other channels in individual regions 23, 24 (FIG. 3) in one display screen, a step of displaying the statement inputted from a local keyboard in an intermediate region 22 (FIG. 3) of the individual regions, and a step of replacing other channel with the channel being noticed when the statement in the region 24 of other channel is specified, which is loaded in a disk drive DD, and its content is read into a personal computer PC.

The read computer program PRa controls the personal computer PC.

The other constitution and operation are same as the constitution and operation of the embodiment of the display method of the chat system according to the third to fifth aspects, and the explanation is omitted.

Figure 16:
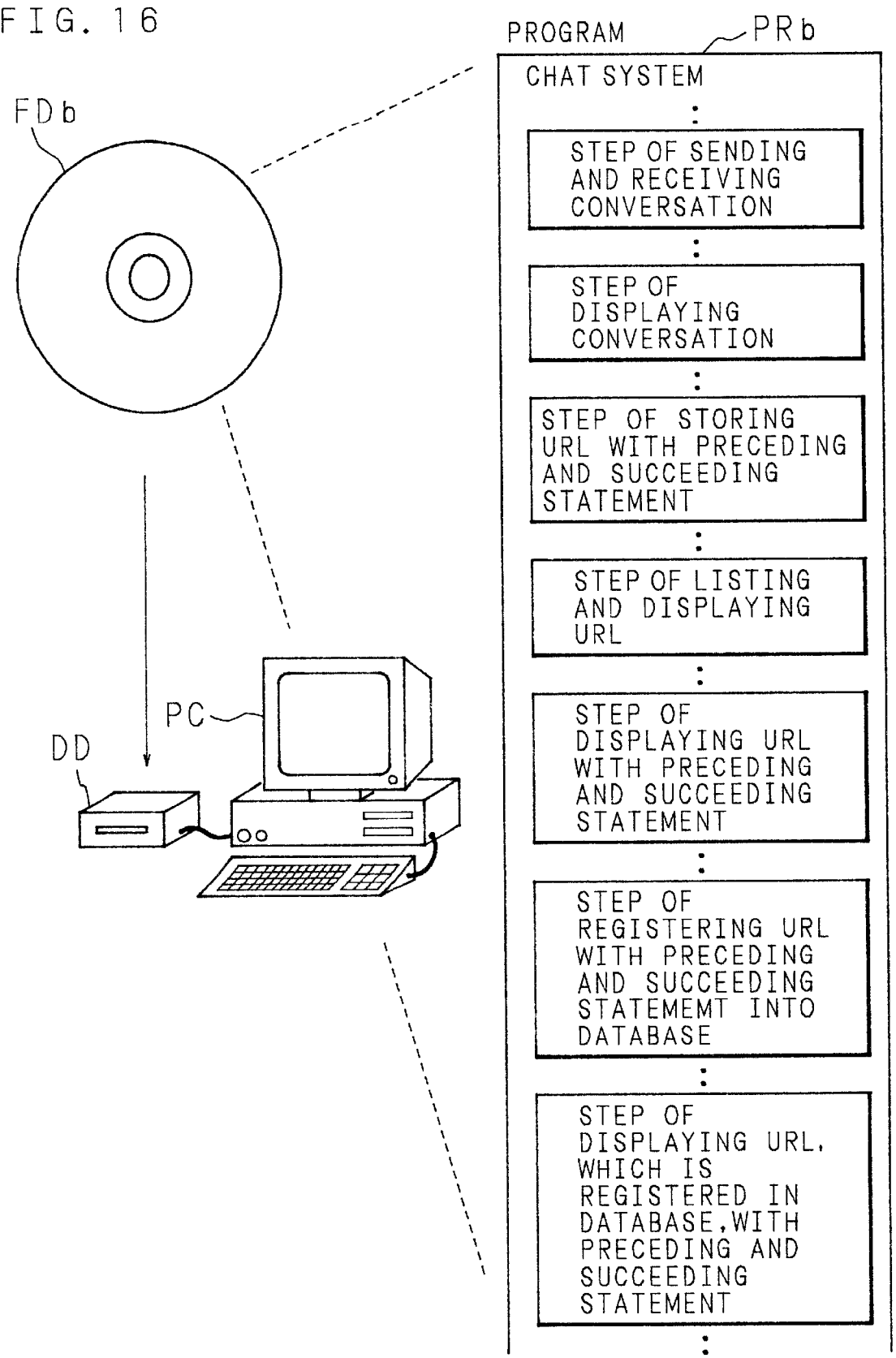
FIG. 16 is an explanatory diagram showing construction of an embodiment of a recording medium in seventeenth and eighteenth aspects of the invention.

FIG. 16 is an explanatory diagram showing a construction of an embodiment of a recording medium according to seventeenth and eighteenth aspects. This recording medium is a recording medium FDb such as flexible disk, CD-ROM disk or magneto-optical disk, recording a computer program PRb comprising a step of sending and receiving conversations in plural channels, a step of displaying these conversations, a step of storing the URL displayed during these conversations together with the statement for a specific number of lines before and after it, a step of listing and displaying the stored URL according to an instruction, a step of listing and displaying a selected URL together with the statement for a specific number of lines before and after it, a step of registering the stored URL and the statement for a specific number of lines before and after it in a database, and a step of listing and displaying the registered URL and the statement for a specific number of lines before and after it according to an instruction, which is loaded in a disk drive DD, and its content is read into a personal computer PC.

The read computer program PRb controls the personal computer PC.

The other constitution and operation are same as the constitution and operation of the embodiment of the display method of the chat system according to the sixth and seventh aspects, and the explanation is omitted.

Figure 17:
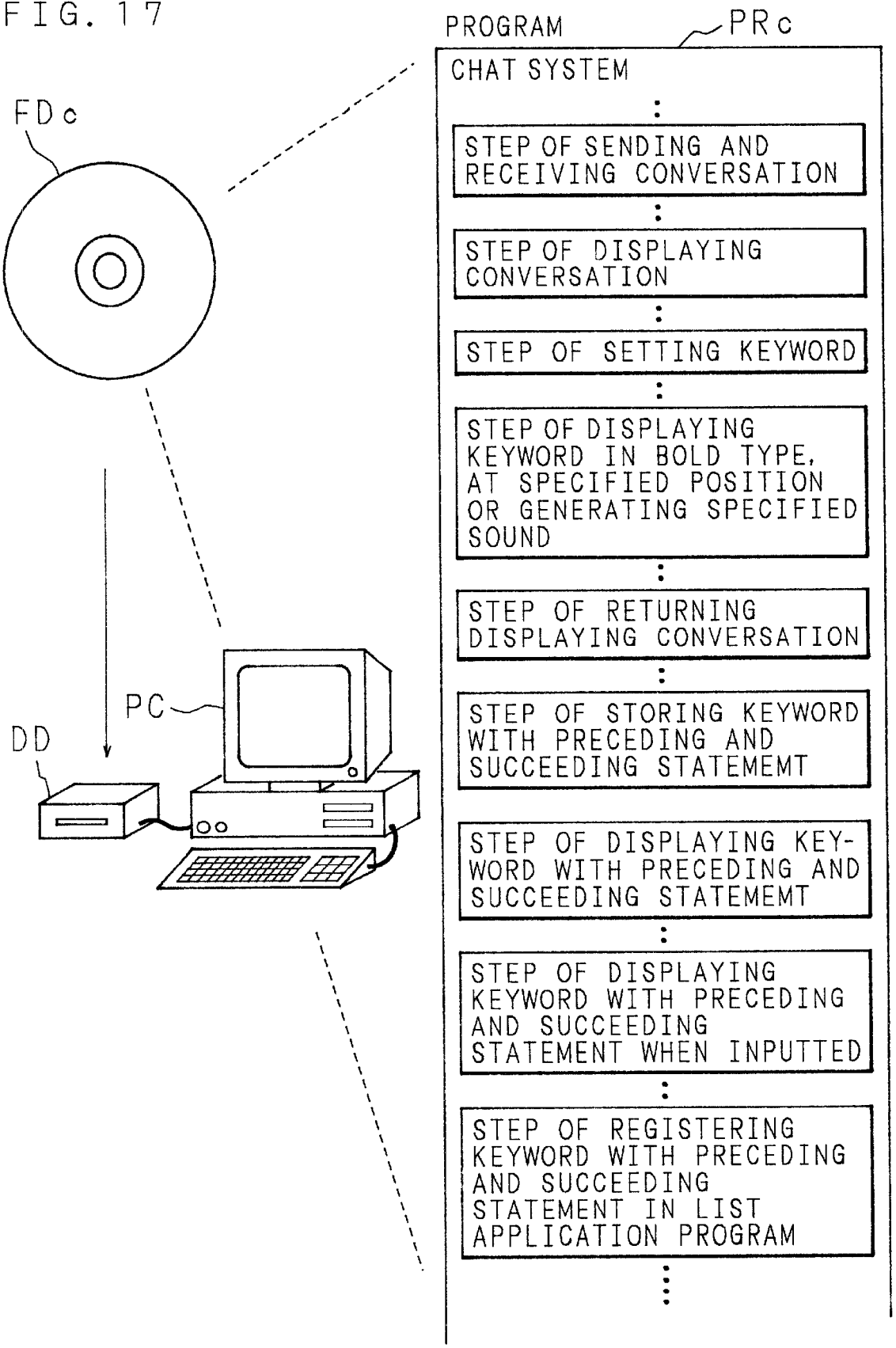
FIG. 17 is an explanatory diagram showing construction of an embodiment of a recording medium in nineteenth to twenty-third aspects of the invention.

FIG. 17 is an explanatory diagram showing a construction of an embodiment of a recording medium according to nineteenth to twenty-third aspects. This recording medium is a recording medium FDc such as flexible disk, CD-ROM disk or magneto-optical disk, recording a computer program PRc comprising a step of sending and receiving conversations in plural channels, a step of displaying these conversations, a step of setting a keyword, a step of displaying the keyword in bold type or generating a specified sound when the keyword is displayed during display of the conversation, a step of returning to the display of conversation when the keyword is received while conversation is not displayed, a step of storing the keyword together with the statement for a specific number of lines before and after it, a step of listing and displaying the keyword together with the statement for a specific number of lines before and after it at the end of conversation, a step of listing and displaying the keyword together with the statement for a specific number of lines before and after when inputted from a local key board after the step of storing the keyword together with the statement for a specific number of lines before and after it, and a step of registering the keyword together with the statement for a specific number of lines before and after it into a list application provided outside at the end of conversation, which is loaded in a disk drive DD, and its content is read into a personal computer PC.

The read computer program PRc controls the personal computer PC.

The other constitution and operation are same as the constitution and operation of the embodiment of the display method of the chat system according to the eighth to twelfth aspects, and the explanation is omitted.

Figure 18:
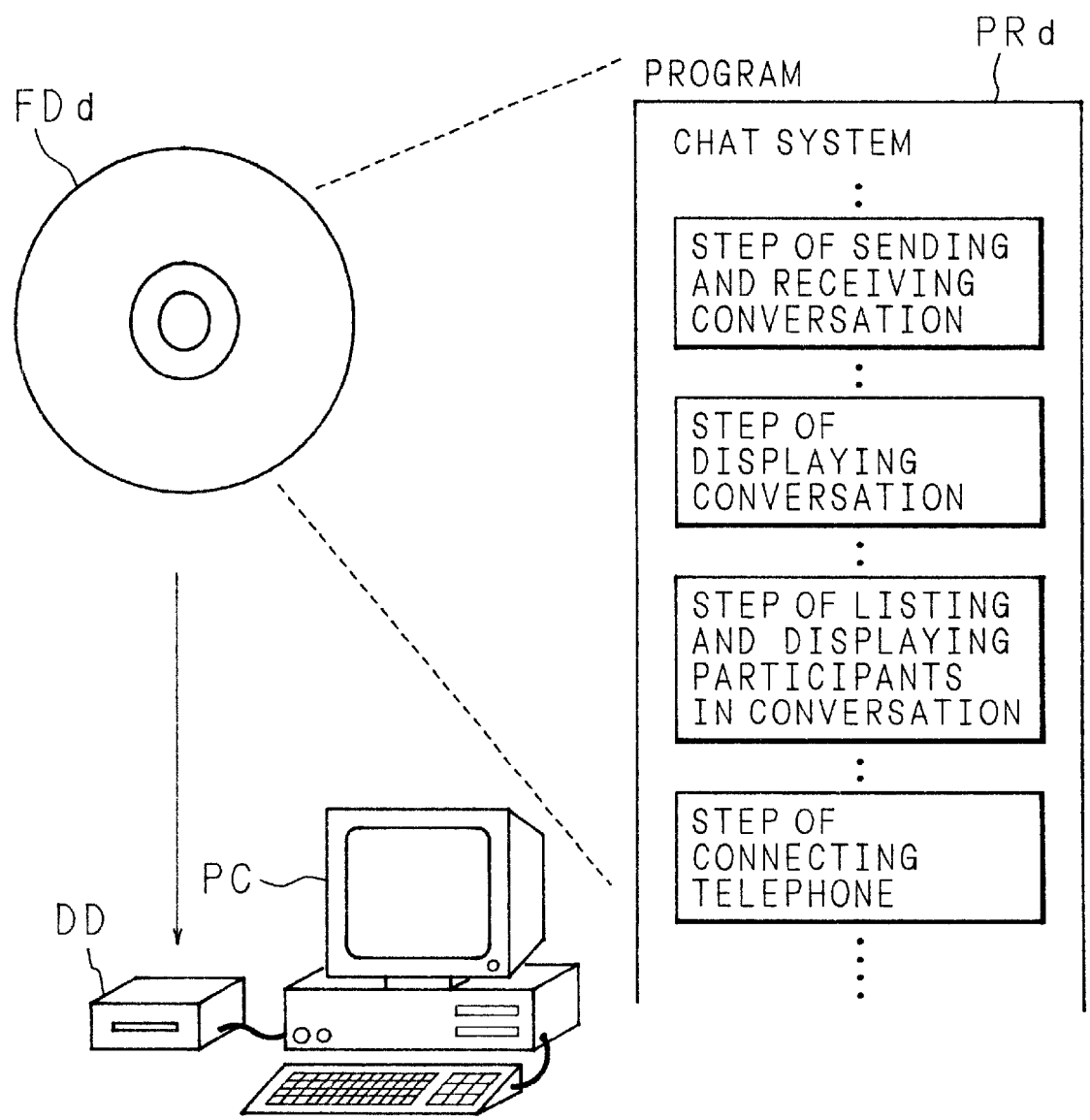
FIG. 18 is an explanatory diagram showing construction of an embodiment of a recording medium in a twenty-fourth aspect of the invention.

FIG. 18 is an explanatory diagram showing a construction of an embodiment of a recording medium according to a twenty-fourth aspect. This recording medium is a recording medium FDd such as flexible disk, CD-ROM disk or magneto-optical disk, recording a computer program PRd comprising a step of sending and receiving conversations in plural channels, a step of displaying these conversations, a step of listing and displaying participants in the conversations, and a step of connecting a selected participant by telephone, which is loaded in a disk drive DD, and its content is read into a personal computer PC.

The read computer program PRd controls the personal computer PC.

The other constitution and operation are same as the constitution and operation of the embodiment of the display method of the chat system according to the thirteenth aspect, and the explanation is omitted.

As described herein, according to the terminal device of the chat system of the first aspect of the invention, the conversations in other channels can be glanced while speaking by paying attention to the conversation content of the presently speaking channel (main channel).

According to the chat system of the second aspect of the invention, in the terminal device, the conversations in other channels can be glanced while speaking by paying attention to the conversation content of the presently speaking channel (main channel).

According to the display method of the chat system of the third aspect of the invention and the computer system controlled by the program recorded in the recording medium of the fourteenth aspect, the conversations in other channels can be glanced while speaking by paying attention to the conversation content of the presently speaking channel (main channel).

According to the display method of the chat system of the fourth aspect of the invention and the computer system controlled by the program recorded in the recording medium of the fifteenth aspect, the conversation contents in the main channel and other channels can be reviewed from the latest one while speaking into the main channel.

According to the display method of the chat system of the fifth aspect of the invention and the computer system controlled by the program recorded in the recording medium of the sixteenth aspect, the operator can immediately participate in the conversation of interesting topic or curious subject.

According to the display method of the chat system of the sixth aspect of the invention and the computer system controlled by the program recorded in the recording medium of the seventeenth aspect, by extracting the context simultaneously with the character string of URL, important information can be picked up from the conversation. Or, by registering in the database, a useful information database accessible any time can be configured from ordinary conversations.

According to the display method of the chat system of the seventh aspect of the invention and the computer system controlled by the program recorded in the recording medium of the eighteenth aspect, by registering in the database, a useful information database accessible any time can be configured from ordinary conversations.

According to the display method of the chat system of the eighth aspect of the invention and the computer system controlled by the program recorded in the recording medium of the nineteenth aspect, the operator, by setting, for example, the own name as the keyword, can reply immediately when the name is called if not exclusively engaged in the conversation, and therefore can do other work at ease. At the same time, the calling side also feels at ease that the partner will respond when the name is called, so that the participants can speak at ease if not exclusively engaged in the conversation.

According to the computer system controlled by the display method of the chat system of the ninth aspect of the invention and the program recorded in the recording medium of the twentieth aspect, the operator, by setting, for example, the own name as the keyword, can reply immediately and confirm the context, too, when the name is called if not exclusively engaged in the conversation, and therefore can do other work at ease. At the same time, the calling side also feels at ease that the partner will respond when the name is called, so that the participants can speak at ease if not exclusively engaged in the conversation.

According to the display method of the chat system of the tenth aspect of the invention and the computer system controlled by the program recorded in the recording medium of the twenty-first aspect, the operator, by setting, for example, the own name as the keyword, can review for which reasons he is called during the day and check for works left undone.

According to the display method of the chat system of the eleventh aspect of the invention and the computer system controlled by the program recorded in the recording medium of the twenty-second aspect, the operator, by setting, for example, the own name as the keyword, can return to the terminal device when the name is called while staying away from the terminal device, and immediately confirm the calling of the name and its context.

According to the display method of the chat system of the twelfth aspect of the invention and the computer system controlled by the program recorded in the recording medium of the twenty-third aspect, the operator, by setting, for example, the own name as the keyword, can review for which reasons he has been called, save the record, and check for works left undone.

According to the display method of the chat system of the thirteenth aspect of the invention and the computer system controlled by the program recorded in the recording medium of the twenty-fourth aspect, the operator can connect by telephone by easy operation when wishing to speak directly person to person during conversation.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A display method for a chat system for displaying simultaneous plural chat room conversations in plural chat room channels, and displaying a conversation corresponding to a main chat room channel and simultaneous plural conversations corresponding to other chat room channels other than the main channel in individual regions of a display screen, and displaying an inputted statement in an intermediate region of individual regions, wherein a chat room channel other than the main chat room channel is converted into the main chat room channel when a predefined statement in an individual region corresponding to said other chat room channels is spoken in said other chat room channels.

2. A display method for a chat system for displaying simultaneous plural chat room conversations in plural chat room channels, and displaying a conversation corresponding to a main chat room channel and simultaneous plural conversations corresponding to other chat room channels other than the main channel in individual regions of a display screen, and displaying an inputted statement in an intermediate region of individual regions, wherein said conversation corresponding to the main chat room channel and said conversations corresponding to other chat room channels are displayed in a time series so that a most recent statement is displayed at a position closest to the intermediate region of the individual regions, wherein a chat room channel other than the main chat room channel is converted into the main chat room channel when a predefined statement in an individual region corresponding to said other chat room channels is spoken in said other chat room channels.

3. A computer memory product readable by a computer to execute a method for displaying conversation in a chat system, said computer memory product comprising:

sending and receiving conversations in plural chat room channels;

displaying, out of the conversations in plural chat room channels, a conversation in a main chat room channel and simultaneous plural conversations in chat room channels other than the main chat room channel in individual regions of a display screen;

displaying an inputted statement in an intermediate region of the individual regions; and replacing a chat room channel of the other chat room channels as the main chat room channel when a predefined statement in an individual region corresponding to said other channel is spoken in said other region.

4. A computer memory product readable by a computer to execute a method for displaying conversation in a chat system, said computer memory product comprising:

sending and receiving conversations in plural chat room channels;

displaying, out of the conversations in plural chat room channels, a conversation in a main chat room channel and simultaneous plural conversations in chat room channels other than the main chat room channel in individual regions of a display screen;

displaying an inputted statement in an intermediate region of the individual regions; and replacing a chat room channel of the other chat room channels as the main chat room channel when a predefined statement in an individual region corresponding to said other channel is specified, wherein said displaying displays the conversations in the other chat room channels in a time series so that a most recent statement is displayed at a position closest to the intermediate region of the individual regions.

5. A computer program product for use with a chat room system, comprising:

a computer usable storage medium having a computer readable program code embodied therein for displaying conversations, said computer readable program code comprising:

causing a computer to send and receive conversations in plural chat room channels;

causing said computer to display, out of the conversations in plural chat room channels, a conversation in a main channel and simultaneous plural conversations in other chat room channels in individual regions of a display screen;

causing said computer to display an inputted statement in an intermediate region of the individual regions; and causing said computer to replace the main chat room channel with another chat room channel from the other chat room channels when a predefined statement in an individual region corresponding to said another channel is spoken in said another chat room.

6. A computer program product for use with a chat room system, comprising:

a computer usable storage medium having a computer readable program code embodied therein for displaying conversations, said computer readable program code comprising:

causing a computer to send and receive conversations in plural chat room channels;

causing said computer to display, out of the conversations in plural chat room channels, a conversation in a main channel and simultaneous plural conversations in other chat room channels in individual regions of a display screen;

causing said computer to display an inputted statement in an intermediate region of the individual regions;

causing said computer to display the conversation in the main chat room channel and the conversations in the other chat room channels in individual regions of the display screen, displays the other channels in a time series so that a most recent statement is displayed at a position closest to the intermediate region of the individual regions; and causing said computer to replace the main chat room channel with another chat room channel from the other chat room channels when a statement in an individual region corresponding to said another chat room channel is spoken in said another chat room.

7. A chat system and database capable of operating on a plurality of channels comprising:

a display device displaying a conversation in a main channel in a top window;

said display device displaying simultaneous plural conversations in other channels in a bottom window;

said display device displaying an inputted statement in a middle window between the top window and the bottom window;

said conversation in said top window is displayed sequentially from top to bottom;

said conversation in said bottom window is displayed sequentially from bottom to top;

a scanning device scanning conversations in said plurality of channels to find a preset keyword or a uniform resource locator (URL);

a storing device storing, when said scanning device finds said keyword or a URL, a predetermined number of lines before and after the keyword or URL in a database; and a cataloging device allowing a user to retrieve from the database the stored predetermined number of lines corresponding to an inputted keyword or a URL.

* * * * *

UNITED STATES PATENT AND TRADEMARK OFFICE
CERTIFICATE OF CORRECTION

PATENT NO.    : 6,370,563 B2
DATED         : April 9, 2002
INVENTOR(S)   : Masahiko Murakami et al.

It is certified that error appears in the above-identified patent and that said Letters Patent is hereby corrected as shown below:

<u>Title page, Item [54] and Column 1, lines 1-3,</u>
Change the title to -- CHAT SYSTEM, TERMINAL DEVICE THEREFOR, DISPLAY METHOD OF CHAT SYSTEM, AND RECORDING MEDIUM --.

Signed and Sealed this

Third Day of September, 2002

*Attest:*

*Attesting Officer*

JAMES E. ROGAN
*Director of the United States Patent and Trademark Office*